(12) United States Patent
Xu et al.

(10) Patent No.: US 10,103,689 B2
(45) Date of Patent: Oct. 16, 2018

(54) POWER SUPPLY SYSTEM WITH INVERTER UNIT CONTROL OF INVERTER AC SIDE NEUTRAL POINT

(71) Applicant: Huawei Technologies Co., Ltd., Shenzhen (CN)

(72) Inventors: Yunyan Xu, Shenzhen (CN); Yongbing Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/822,716

(22) Filed: Nov. 27, 2017

(65) Prior Publication Data

US 2018/0083571 A1  Mar. 22, 2018

Related U.S. Application Data

(63) Continuation of application No. PCT/CN2016/083318, filed on May 25, 2016.

(30) Foreign Application Priority Data

May 27, 2015 (CN) .......................... 2015 1 0280543

(51) Int. Cl.
*H02M 7/493* (2007.01)
*H02S 40/38* (2014.01)
*H02S 40/32* (2014.01)
*G05F 1/67* (2006.01)
(Continued)

(52) U.S. Cl.
CPC ................ *H02S 40/38* (2014.12); *G05F 1/67* (2013.01); *H02J 3/383* (2013.01); *H02S 40/32* (2014.12); *H02M 7/493* (2013.01); *H02M 2001/123* (2013.01)

(58) Field of Classification Search
CPC .... H02M 7/493; H02M 2001/123; G05F 1/67
See application file for complete search history.

(56) References Cited

U.S. PATENT DOCUMENTS 5,831,842 A * 11/1998 Ogasawara ............. H02M 1/12
363/40
9,866,145 B2 * 1/2018 Valiani .................. H02M 7/493
2009/0315404 A1 12/2009 Cramer et al.
(Continued)

FOREIGN PATENT DOCUMENTS

CN  101931238 A  12/2010
CN  203151115 U  8/2013
(Continued)

*Primary Examiner* — Harry Behm
(74) *Attorney, Agent, or Firm* — Leydig, Voit & Mayer, Ltd.

(57) ABSTRACT

The present invention relates to the photoelectric field, and provides a power supply system and a power supply method, so as to reduce costs of a lead between a positive electrode or a negative electrode of a photovoltaic panel and a direct current voltage source. The power supply system includes: a photovoltaic panel string, an inverter connected to the photovoltaic panel string, and a transformer connected to the inverter. The power supply system further includes a voltage controller. The voltage controller includes a first terminal, a second terminal, and a third terminal. The voltage controller further includes: a first sampling unit, a control unit connected to the first sampling unit, and an inverter unit.

11 Claims, 6 Drawing Sheets

(51) Int. Cl.
*H02J 3/38* (2006.01)
*H02M 1/12* (2006.01)

(56) References Cited

U.S. PATENT DOCUMENTS

| | | |
|---|---|---|
| 2012/0261990 A1 | 10/2012 | Collins et al. |
| 2013/0088086 A1 | 4/2013 | Coors et al. |
| 2016/0377670 A1* | 12/2016 | Tamida ................ G01R 27/025 324/551 |

FOREIGN PATENT DOCUMENTS

| | | |
|---|---|---|
| CN | 103337874 A | 10/2013 |
| CN | 103441531 A | 12/2013 |
| CN | 103701150 A | 4/2014 |
| CN | 104600811 A | 5/2015 |
| CN | 104901618 A | 9/2015 |
| EP | 2136449 A1 | 12/2009 |
| EP | 2364522 A1 | 9/2011 |
| JP | 2010199443 A | 9/2010 |
| WO | 2010051812 A1 | 5/2010 |

* cited by examiner

- - PRIOR ART - -

POWER SUPPLY SYSTEM WITH INVERTER UNIT CONTROL OF INVERTER AC SIDE NEUTRAL POINT

CROSS-REFERENCE TO RELATED APPLICATIONS

This application is a continuation of International Application No. PCT/CN2016/083318, filed on May 25, 2016, which claims priority to Chinese Patent Application No. 201510280543.8, filed on May 27, 2015. The disclosures of the aforementioned applications are hereby incorporated by reference in their entireties.

TECHNICAL FIELD

The present invention relates to the photoelectric field, and in particular, to a power supply system and a power supply method.

BACKGROUND

A photovoltaic power generating system generally includes photovoltaic panels, an inverter, a transformer, and other apparatuses. A positive electrode and a negative electrode of a photovoltaic panel are connected to two input ends of the inverter. The inverter has three output ends connected to the transformer, and outputs a three-phase alternating current. Generally, the photovoltaic panels are classified into a P-type photovoltaic panel and an N-type photovoltaic panel. When a voltage between a negative electrode of the P-type photovoltaic panel and ground is negative, or when a voltage between a positive electrode of the N-type photovoltaic panel and ground is positive, output power degradation of the photovoltaic panel is caused. This is referred to as a PID potential induced degradation, potential induced degradation (PID) effect of the photovoltaic panel.

To suppress the PID effect of the photovoltaic panel, a circuit shown in FIG. 1 is used in the prior art. A direct current voltage source is connected between a negative electrode of a P-type photovoltaic panel string and the ground, to increase a negative voltage between the negative electrode of the P-type photovoltaic panel string and the ground, or a direct voltage source is connected between a positive electrode of an N-type photovoltaic panel string and the ground, to lower a positive voltage between the positive electrode of the N-type photovoltaic panel string and the ground, so as to suppress the PID effect of the photovoltaic panel string.

When the voltage between the positive electrode or the negative electrode of the photovoltaic panel and the ground is controlled by using the method, the positive electrode or the negative electrode of each photovoltaic panel needs to be connected to a direct voltage source by using a lead, leading to an increase in lead costs and relatively complex wiring.

SUMMARY

Embodiments of the present invention provide a power supply system and a power supply method, so as to reduce costs of a lead between a positive electrode or a negative electrode of a photovoltaic panel and a direct current voltage source.

To achieve the foregoing objective, the following technical solutions are used in the embodiments of the present invention.

According to a first aspect, an embodiment of the present invention provides a power supply system, including: a photovoltaic panel string, an inverter, and a transformer, where an input end of the inverter is connected to an output end of the photovoltaic panel string, an output end of the inverter is connected to an input end of the transformer, and an output end of the transformer is configured to output a supply voltage, where the power supply system further including a voltage controller, where the voltage controller includes: a first sampling unit, a control unit connected to the first sampling unit, and an inverter unit connected to both the first sampling unit and the control unit; and the voltage controller further includes: a first terminal, a second terminal, and a third terminal, where an end of the first terminal is connected to a first output end of the inverter unit, the other end of the first terminal is connected to a first output end of the inverter, an end of the second terminal is connected to a second output end of the inverter unit, the other end of the second terminal is connected to a second output end of the inverter, an end of the third terminal is connected to a third output end of the inverter unit, and the other end of the third terminal is connected to a third output end of the inverter;

the inverter unit includes: an energy storage circuit, a primary circuit connected to the energy storage circuit, and a filter circuit connected to the primary circuit;

the first sampling unit is configured to sample an initial voltage of a neutral point of the energy storage circuit in the inverter unit; the control unit is configured to determine, according to a difference between the initial voltage and a first voltage, a duty cycle of a pulse width modulation PWM signal outputted by the control unit, and drive on/off of switching transistors of the primary circuit in the inverter unit according to the PWM signal, so as to control the inverter unit to output a first alternating current voltage through the filter circuit, where the first voltage is a voltage to ground of the photovoltaic panel string connected to the input end of the inverter; and the inverter unit is configured to output the first alternating current voltage under control of the control unit; and if a peak amplitude of the first alternating current voltage is greater than a peak amplitude of a second alternating current voltage outputted by the inverter, the control unit controls the energy storage circuit to discharge, to lower a voltage of a neutral point of an alternating current side of the inverter; or if the peak amplitude of the first alternating current voltage is less than the peak amplitude of the second alternating current voltage, the control unit controls the energy storage circuit to be charged, to increase the voltage of the neutral point of the alternating current side of the inverter, wherein the alternating current side of the inverter is a side of the inverter for outputting an alternating current voltage.

With reference to the first aspect, in a first possible implementation manner of the first aspect, the energy storage circuit includes at least one capacitance element, where the capacitance element is directly grounded, or grounded by means of an inductor, or grounded by means of a resistor, or grounded by means of a diode; the primary circuit is a three-phase inverter bridge circuit, and is configured to convert a first direct current voltage to the first alternating current voltage, where the first direct current voltage is a voltage of the energy storage circuit; and the filter circuit is configured to output the first alternating current voltage.

With reference to the first possible implementation manner of the first aspect, in a second possible implementation manner of the first aspect, the energy storage circuit includes two capacitance elements, where the two capacitance elements are connected in series, and a midpoint between the two capacitance elements is directly grounded, or grounded by means of an inductor, or grounded by means of a resistor, or grounded by means of a diode.

With reference to the first aspect, in a third possible implementation manner of the first aspect, the inverter includes: a second sampling unit and a first communications unit connected to the second sampling unit, and the voltage controller further includes a second communications unit, where the second sampling unit is configured to sample the voltage to ground of the photovoltaic panel string connected to the input end of the inverter, the first communications unit is configured to communicate with the second communications unit in the voltage controller, and the second communications unit is configured to communicate with the first communications unit in the inverter, to obtain the voltage to ground of the photovoltaic panel string connected to the input end of the inverter.

With reference to the first aspect, or the first possible implementation manner of the first aspect, or the second possible implementation manner of the first aspect, in a fourth possible implementation manner of the first aspect, the inverter unit is a two-level inverter circuit, or a three-level inverter circuit, or a multi-level inverter circuit.

With reference to the first aspect, in a fifth possible implementation manner of the first aspect, the power supply system includes M inverters, M photovoltaic panel strings, and one voltage controller, where the M inverters are connected in parallel, an input end of each inverter is connected to the output end of one photovoltaic panel string, an output end of each inverter is connected to the input end of the transformer, a first output end of each inverter is connected to the first terminal of the voltage controller, a second output end of each inverter is connected to the second terminal of the voltage controller, and a third output end of each inverter is connected to the third terminal of the voltage controller.

According to a second aspect, an embodiment of the present invention provides a power supply method, including:

obtaining a first voltage and an initial voltage, where the first voltage is a voltage to ground of a photovoltaic panel string connected to an input end of an inverter, and the initial voltage is an initial voltage of a neutral point of an inverter unit in a voltage controller;

controlling, according to the first voltage and the initial voltage, the inverter unit to output a first alternating current voltage; and if a peak amplitude of the first alternating current voltage is greater than a peak amplitude of a second alternating current voltage outputted by the inverter, controlling the inverter unit to discharge, to lower a voltage of a neutral point of an alternating current side of the inverter; or if the peak amplitude of the first alternating current voltage is less than the peak amplitude of the second alternating current voltage, controlling the inverter unit to be charged, to increase the voltage of the neutral point of the alternating current side of the inverter, where the alternating current side of the inverter is a side of the inverter for outputting an alternating current voltage.

With reference to the second aspect, in a first possible implementation manner of the second aspect, if the photovoltaic panel string is a P-type photovoltaic panel string, the power supply method specifically includes:

obtaining a voltage between a negative electrode of the P-type photovoltaic panel string and ground and the initial voltage of the neutral point of the inverter unit; and if the voltage between the negative electrode of the P-type photovoltaic panel string and the ground is less than zero volts, adjusting on/off of power components in the inverter unit according to the initial voltage and the voltage between the negative electrode of the P-type photovoltaic panel string and the ground, to control the inverter unit to output the first alternating current voltage, where the peak amplitude of the first alternating current voltage is less than the peak amplitude of the second alternating current voltage, so as to charge the inverter unit, to increase the voltage of the neutral point of the alternating current side of the inverter, so that the voltage between the negative electrode of the P-type photovoltaic panel string and the ground is greater than or equal to zero volts.

With reference to the second aspect, in a second possible implementation manner of the second aspect, if the photovoltaic panel string is an N-type photovoltaic panel string, the power supply method specifically includes:

obtaining a voltage between a positive electrode of the N-type photovoltaic panel string and ground and the initial voltage of the neutral point of the inverter unit; and if the voltage between the positive electrode of the N-type photovoltaic panel string and the ground is greater than zero volts, adjusting on/off of power components in the inverter unit according to the initial voltage and the voltage between the positive electrode of the N-type photovoltaic panel string and the ground, to control the inverter unit to output the first alternating current voltage, wherein the peak amplitude of the first alternating current voltage is greater than the peak amplitude of the second alternating current voltage, so as to cause the inverter unit to discharge, to lower the voltage of the neutral point of the alternating current side of the inverter, so that the voltage between the positive electrode of the N-type photovoltaic panel string and the ground is less than or equal to zero volts.

With reference to the second aspect, in a third possible implementation manner of the second aspect, there are M inverters and M photovoltaic panel strings, the M inverters are connected in parallel, an input end of each inverter is connected to one photovoltaic panel string, and if the photovoltaic panel strings are P-type photovoltaic panel strings, the power supply method specifically includes:

obtaining voltages between negative electrodes of all the P-type photovoltaic panel strings and ground and the initial voltage of the neutral point of the inverter unit; and if the smallest value in the voltages between the negative electrodes of all the P-type photovoltaic panel strings and the ground is less than zero volts, adjusting on/off of power components in the inverter unit according to the initial voltage and the smallest value in the voltages between the negative electrodes of the P-type photovoltaic panel strings and the ground, to control the inverter unit to output the first alternating current voltage, where the peak amplitude of the first alternating current voltage is less than the peak amplitude of the second alternating current voltage, so that the inverter unit is charged, to increase the voltage of the neutral point of the alternating current side of the inverter, and the smallest value in the voltages between the negative electrodes of the P-type photovoltaic panel strings and the ground is greater than or equal to zero volts.

With reference to the second aspect, in a fourth possible implementation manner of the second aspect, there are M inverters and M photovoltaic panel strings, the M inverters are connected in parallel, an input end of each inverter is connected to one photovoltaic panel string, and if the photovoltaic panel strings are N-type photovoltaic panel strings, the power supply method specifically includes:

obtaining voltages between positive electrodes of all the N-type photovoltaic panel strings and ground and the initial voltage of the neutral point of the inverter unit; and if a largest value in the voltages between the positive electrodes of all the N-type photovoltaic panel strings and the ground is greater than zero volts, adjusting on/off of power components in the inverter unit according to the initial voltage and the largest value in the voltages between the positive electrodes of the N-type photovoltaic panel strings and the ground, to control the inverter unit to output the first alternating current voltage, where the peak amplitude of the first alternating current voltage is greater than the peak amplitude of the second alternating current voltage, so as to cause the inverter unit to discharge, to lower the voltage of the neutral point of the alternating current side of the inverter, so that the largest value in the voltages between the positive electrodes of the N-type photovoltaic panel strings and the ground is less than or equal to zero volts.

According to the power supply system and the power supply method that are provided in the embodiments of the present invention, the power supply system includes: a photovoltaic panel string, an inverter, and a transformer. An input end of the inverter is connected to an output end of the photovoltaic panel string, an output end of the inverter is connected to an input end of the transformer, and an output end of the transformer is configured to output a supply voltage. The power supply system further includes a voltage controller. The voltage controller includes: a first sampling unit, a control unit connected to the first sampling unit, and an inverter unit connected to both the first sampling unit and the control unit. The voltage controller further includes: a first terminal, a second terminal, and a third terminal. An end of the first terminal is connected to a first output end of the inverter unit, and the other end of the first terminal is connected to a first output end of the inverter. An end of the second terminal is connected to a second output end of the inverter unit, and the other end of the second terminal is connected to a second output end of the inverter. An end of the third terminal is connected to a third output end of the inverter unit, and the other end of the third terminal is connected to a third output end of the inverter. The inverter unit includes: an energy storage circuit, a primary circuit connected to the energy storage circuit, and a filter circuit connected to the primary circuit. The first sampling unit is configured to sample an initial voltage of a neutral point of the energy storage circuit in the inverter unit. The control unit is configured to control, according to a difference between the initial voltage and the first voltage, on/off of switching transistors of the primary circuit in the inverter unit, so that the filter circuit of the inverter unit outputs a first alternating current voltage, where the first voltage is a voltage to ground of the photovoltaic panel string connected to the input end of the inverter. The inverter unit is configured to output the first alternating current voltage under control of the control unit. If a peak amplitude of the first alternating current voltage is greater than a peak amplitude of a second alternating current voltage outputted by the inverter, the control unit controls the energy storage circuit to discharge, to lower a voltage of a neutral point of an alternating current side of the inverter; or if the peak amplitude of the first alternating current voltage is less than the peak amplitude of the second alternating current voltage, the control unit controls the energy storage circuit to be charged, to increase the voltage of the neutral point of the alternating current side of the inverter. The alternating current side of the inverter is a side of the inverter for outputting an alternating current voltage. In the prior art, a positive electrode or a negative electrode of each photovoltaic panel needs to be connected to a direct current voltage source by using a lead, making it relatively difficult to operate. By means of the solution provided in the present invention, no lead needs to be added to the positive electrode or the negative electrode of the photovoltaic panel, so that costs of leads between devices can be reduced.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Figure 1:
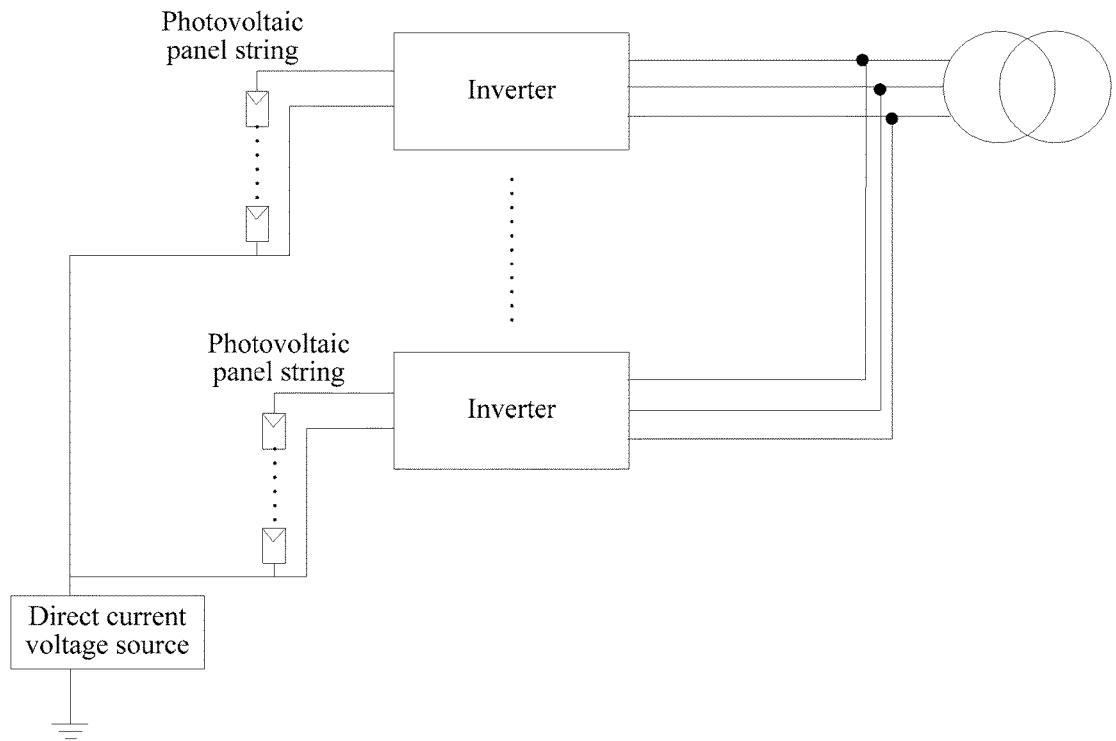
FIG. 1 is a schematic structural diagram of a circuit for suppressing a PID effect of a photovoltaic panel in the prior art.
Figure 2:
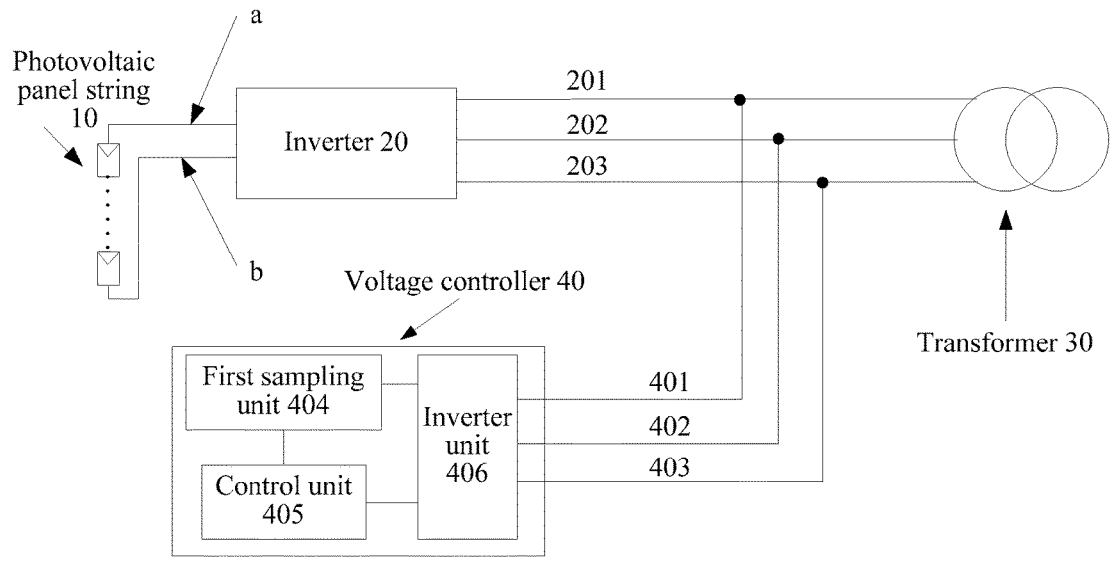
FIG. 2 is a schematic diagram 1 of a power supply system according to an embodiment of the present invention.

An embodiment of the present invention provides a power supply system. As shown in FIG. 2, the power supply system includes: a photovoltaic panel string 10, an inverter 20 connected to the photovoltaic panel string 10, and a transformer 30 connected to the inverter 20. The photovoltaic panel string 10 outputs a direct current voltage to the inverter 20 through a positive electrode a and a negative electrode b of the photovoltaic panel string 10, and the inverter 20 converts the direct current voltage to an alternating current voltage, and outputs the alternating current voltage to the transformer 30 through an alternating current voltage output end of the inverter 20.

The power supply system further includes a voltage controller 40. The voltage controller 40 includes: a first terminal 401, a second terminal 402, a third terminal 403, a first sampling unit 404, a control unit 405 connected to the first sampling unit 404, and an inverter unit 406 connected to both the first sampling unit 404 and the control unit 405.

An end of the first terminal 401 is connected to a first output end of the inverter unit, and the other end of the first terminal 401 is connected to a first output end 201 of the inverter. An end of the second terminal 402 is connected to a second output end of the inverter unit, and the other end of the second terminal 402 is connected to a second output end 202 of the inverter. An end of the third terminal 403 is connected to a third output end of the inverter unit, and the other end of the third terminal 403 is connected to a third output end 203 of the inverter. When the voltage controller 40 discharges through an energy storage circuit in the inverter unit, the voltage controller 40 outputs electric energy to an alternating current side of the inverter (that is, a side of the inverter for outputting the alternating current voltage) through the first terminal 401, the second terminal 402, and the third terminal 403. When the voltage controller 40 charges the energy storage circuit in the inverter unit from the alternating current side of the inverter, the voltage controller 40 receives electric energy inputted from the alternating current side of the inverter, through the first terminal 401, the second terminal 402, and the third terminal 403.

Figure 3:
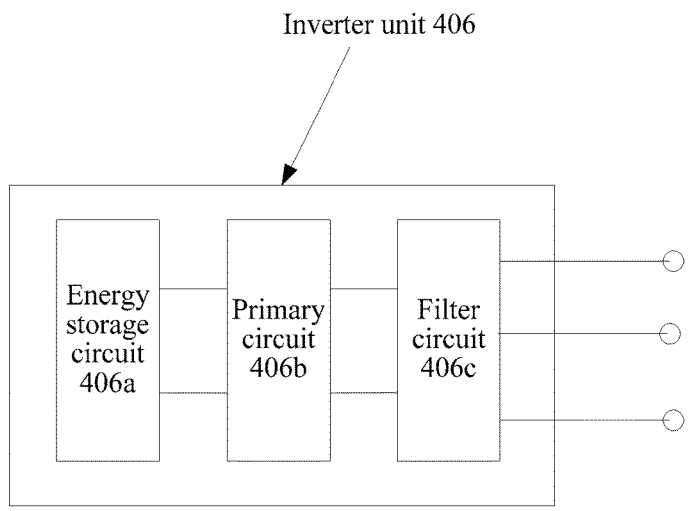
FIG. 3 is a circuit diagram 1 of an inverter unit according to an embodiment of the present invention.

The inverter unit 406 may be a two-level inverter circuit, a three-level inverter circuit, or a multi-level inverter circuit. A description is provided by using an example in which the inverter unit 406 is a two-level inverter circuit. As shown in FIG. 3, the inverter unit 406 includes: an energy storage circuit 406a, a primary circuit 406b, and a filter circuit 406c. An input end of the primary circuit is connected to an output end of the energy storage circuit, and an output end of the primary circuit is connected to an input end of a filter circuit.

The voltage controller 40 further includes: the first sampling unit 404, configured to sample an initial voltage of a neutral point of the energy storage circuit in the inverter unit; the control unit 405, connected to the first sampling unit 404, and configured to determine, according to a difference between the initial voltage and a first voltage, a duty cycle of a PWM (Pulse Width Modulation, pulse width modulation) signal outputted by the control unit, and drive on/off of switching transistors of the primary circuit in the inverter unit according to the PWM signal, so as to control the inverter unit to output a first alternating current voltage through the filter circuit, where the first voltage is a voltage to ground of the photovoltaic panel string 10 connected to an input end of the inverter 20; and the inverter unit 406, connected to both the control unit 405 and the first sampling unit 404, and configured to output the first alternating current voltage under control of the control unit 405, where if a peak amplitude of the first alternating current voltage is greater than a peak amplitude of a second alternating current voltage outputted by the inverter, the energy storage circuit discharges, to lower a voltage of a neutral point of the alternating current side of the inverter; or if the peak amplitude of the first alternating current voltage is less than the peak amplitude of the second alternating current voltage, the energy storage circuit is charged, to increase the voltage of the neutral point of the alternating current side of the inverter, where the alternating current side of the inverter is the side of the inverter for outputting the alternating current voltage.

The input end of the primary circuit is connected to the output end of the energy storage circuit, and the output end of the primary circuit is connected to the input end of the filter circuit. The energy storage circuit 406a includes at least one capacitance element, configured to exchange energy with the alternating current side of the inverter (that is, the alternating current voltage output end of the inverter 20) by means of charging and discharging processes. The at least one capacitance element may be directly grounded, or grounded by means of an inductor, or grounded by means of a resistor, or grounded by means of a diode. This is not limited in the present invention. The primary circuit 406b is a three-phase inverter bridge circuit, includes multiple power tubes, and is configured to be switched on/off under driving of the PWM (pulse-width modulation, pulse width modulation) signal generated by the control unit 405, and convert a voltage on the capacitance element to an alternating current voltage in the discharging process of the capacitance element. The filter circuit 406c is configured to rectify and filter the alternating current voltage generated by the primary circuit 406b and output the first alternating current voltage.

Figure 4:
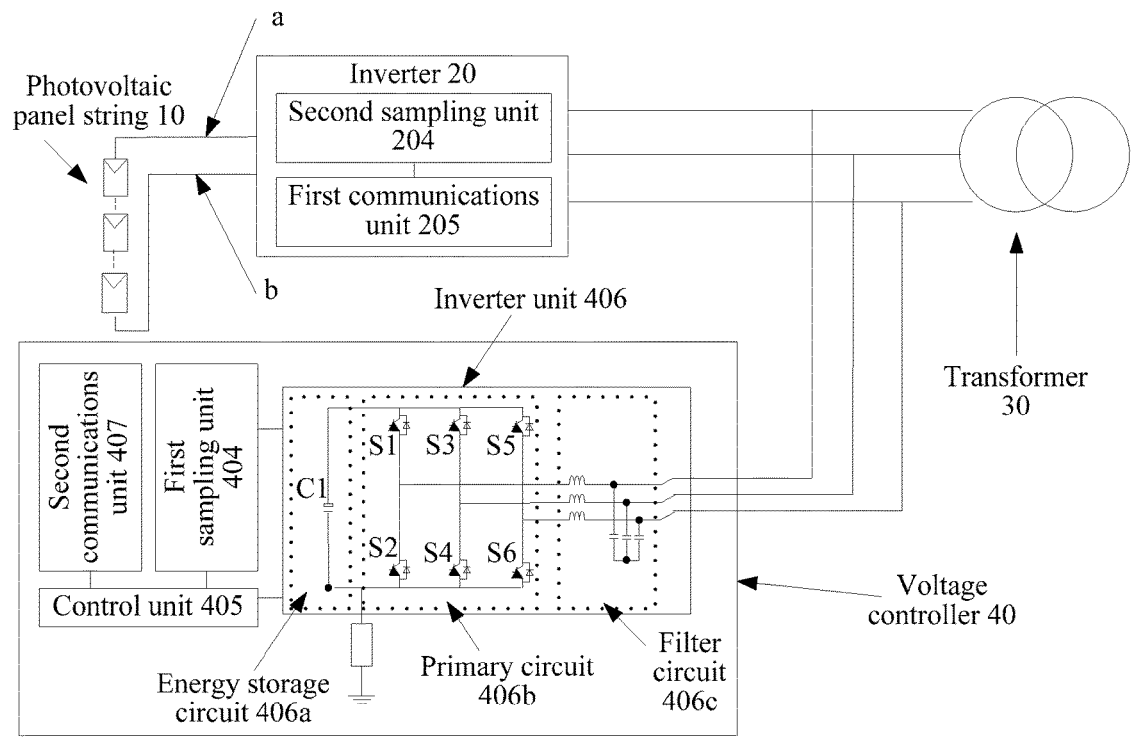
FIG. 4 is a schematic diagram 2 of a power supply system according to an embodiment of the present invention.

Further, as shown in FIG. 4, in the power supply system provided in this embodiment of the present invention, the inverter 20 includes a second sampling unit 204, configured to sample the voltage to ground of the photovoltaic panel string 10 connected to the input end of the inverter 20, and the inverter 20 further includes: a first communications unit 205, connected to the second sampling unit 204, and configured to communicate with the voltage controller 40. Specifically, the first communications unit 205 is configured to communicate with a second communications unit 407 in the voltage controller 40, and transmit the voltage to ground of the photovoltaic panel string 10 obtained through sampling by the second sampling unit 204 to the second communications unit 407 in the voltage controller 40.

The voltage controller 40 further includes a second communications unit 407, configured to communicate with the first communications unit 205 in the inverter 20, to obtain the voltage to ground of the photovoltaic panel string 10 connected to the input end of the inverter 20.

The first communications unit 205 and the second communications unit 407 may communicate in such a communication manner as by means of PLC (power line communication, power line carrier communication), wireless communication, or RS485 communication. This is not limited in the present invention.

Figure 5:
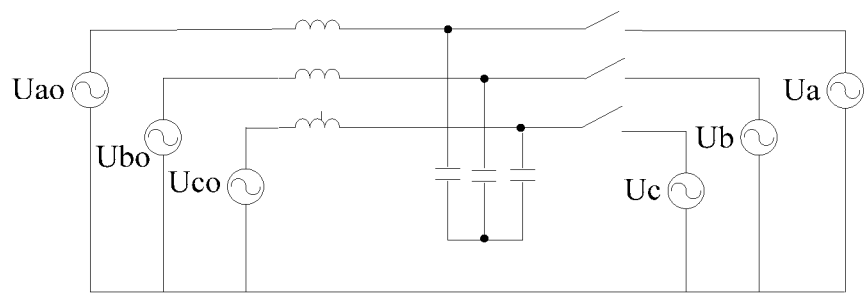
FIG. 5 is an equivalent circuit diagram of a power supply system according to an embodiment of the present invention.

For example, when the inverter unit 406 is a two-level inverter circuit, the circuit diagram of the power supply system is shown in FIG. 4. Specifically, a process in which the inverter unit 406 adjusts the voltage of the neutral point of the alternating current side of the inverter by outputting the first alternating current voltage is as follows:

The primary circuit 406b includes six power tubes, and the six power tubes form a three-phase inverter bridge circuit. S1 and S2 are turned on complementarily to each another, to output an alternating current voltage Uao. S3 and S4 are turned on complementarily to each another, to output an alternating current voltage Ubo. S5 and S6 are turned on complementarily to each another, to output an alternating current voltage Uco. Specifically, Uao, Ubo, and Uco are alternating current voltages in a sine wave form. When the alternating current voltage Uao outputted by the inverter unit 406 and an alternating current voltage Ua outputted by the inverter 20 have same amplitudes, frequencies, and phases, the alternating current voltage Ubo outputted by the inverter unit 406 and an alternating current voltage Ub outputted by the inverter 20 have same amplitudes, frequencies, and phases, and the alternating current voltage Uco outputted by the inverter unit 406 and an alternating current voltage Uc outputted by the inverter 20 have same amplitudes, frequencies, and phases, the power supply system is in a steady state. An equivalent circuit of the power supply system is shown in FIG. 5. Exchange between energy in the energy storage circuit 406a and energy of the alternating current side of the inverter may be caused by changing the amplitudes of Uao, Ubo, and Uco, and because a negative electrode of a capacitor in the energy storage circuit 406a is grounded, the voltage of the neutral point of the alternating current side of the inverter may be changed by changing the voltage of the capacitor in the energy storage circuit.

It should be noted that, a PLC communications apparatus may be integrated in the second communications unit 407. The PLC communications apparatus is connected to the inverter 20 in the power supply system. The second communications unit 407 communicates with a PLC communications apparatus in the first communications unit 205 in the inverter 20 by using a carrier modulation circuit, to read the voltage to ground of the photovoltaic panel string 10 connected to two input ends of the inverter 20. In an example in which the photovoltaic panel string 10 is a P-type photovoltaic panel, a voltage between a negative electrode of the photovoltaic panel string 10 and the ground (that is, a voltage between a negative electrode of the P-type photovoltaic panel and the ground) that is read by the second communications unit 407 through the first communications unit 205 is −400 volts, a sampling result of sampling the initial voltage (half a voltage at two ends of a capacitor C1 in the energy storage circuit 406a) of the neutral point of the inverter unit 406 by the first sampling unit 404 is −300 volts, and the control unit 405 controls the PWM signal according to the difference (the difference here is 100 volts, that is, −300 minus−400=100 volts) between the initial voltage and the voltage to ground of the photovoltaic panel string 10 read by the second communications unit 407, so as to lower amplitudes of the output voltages (that is, the first alternating current voltages) Uao, Ubo, and Uco of the inverter unit 406, so that the energy of the alternating current side of the inverter flows to the voltage controller 40, to charge the energy storage circuit 406a, and the voltage at the two ends of the capacitor C1 increases. When a voltage charged from the two ends of the capacitor C1 to the neutral point reaches −400 volts, the control unit 405 controls the PWM signal, so that an energy balance is reached between the voltage controller 40 and the alternating current side of the inverter, thereby maintaining a steady state. It should be noted that when the power supply system is in the steady state, the voltage of the neutral point of the alternating current side of the inverter is the same as a voltage at a midpoint of the capacitor in the energy storage circuit 406, and a voltage at a midpoint of the photovoltaic panel string is also the same as the voltage of the neutral point of the alternating current side of the inverter. Therefore, the voltage of the neutral point of the alternating current side of the inverter is finally reduced from −300 volts to −400 volts by the process, so that the voltage between the negative electrode of the P-type photovoltaic panel and the ground is increased from −400 volts to 0 volts, thereby suppressing a PID effect of the P-type photovoltaic panel.

It should be noted that, in a general power supply system, a voltage of a neutral point of a power grid, a voltage of a neutral point of an alternating current side of an inverter, and a voltage of a neutral point of a photovoltaic panel string are the same. The neutral point refers to a fiducial point of all voltage values in the power supply system. For example, when a supply voltage of the power grid is an alternating current voltage of 220 volts, a fiducial point of the alternating current voltage of 220 volts is the ground. That is, generally, a neutral point of the power supply system is the ground, and a voltage of the neutral point is 0 volts.

Further, in the general power supply system, assuming that a direct current voltage between the positive electrode and the negative electrode of the P-type photovoltaic panel string is 800 volts, because the voltage of the neutral point in the power supply system is 0 volts, a voltage of the positive electrode of the P-type photovoltaic panel string is 400 volts, and a voltage of the negative electrode is −400 volts. Consequently, there is a negative voltage of −400 volts between the negative electrode of the photovoltaic panel string and the ground, causing power degradation of the photovoltaic panel string.

Still further, in the power supply system provided in this embodiment of the present invention, the voltage controller is added. After the power supply system provided in this embodiment of the present invention starts to operate, first, the energy storage circuit in the voltage controller is charged, so that the first alternating current voltage outputted by the inverter unit is the same as the second alternating current voltage outputted by the inverter (where amplitudes, phases, and frequencies of the voltages are all the same). Generally, a voltage value of the energy storage circuit is approximately twice a peak amplitude of the supply voltage of the power grid. It is assumed that when the voltage at the two ends of the capacitor in the energy storage circuit is −500 volts, the power supply system reaches the steady state. Because the voltage of the neutral point of the energy storage circuit is half a total voltage of the capacitor in the energy storage circuit, the voltage of the neutral point of the energy storage circuit is −250 volts.

In this case, the voltage to ground of the P-type photovoltaic panel string is compensated. For example, the control unit determines, according to a difference of 150 volts between the initial voltage of −250 volts and the first voltage of −400 volts, the duty cycle of the PWM signal outputted by the control unit, and drive, by using the PWM signal, on/off of the switching transistors of the primary circuit in the inverter unit, so as to lower the amplitude of the first alternating current voltage outputted by the inverter unit through the filter circuit, so that the energy of the alternating current side of the inverter flows to the voltage controller, to charge the energy storage circuit in the inverter unit. When the voltage of the neutral point of the energy storage circuit is increased from −250 volts to −400 volts (that is, the voltage at the two ends of the capacitor in the energy storage circuit is −800 volts), the control unit adjusts the duty cycle of the PWM signal, so that an amplitude value of the first alternating current voltage is the same as an amplitude value of the voltage of the energy storage circuit. In this case, the voltage of the neutral point of the alternating current side of the inverter is −400 volts, and a balance is reached between the voltage of the alternating current side of the inverter and the voltage outputted by the voltage controller.

It should be added that increasing the voltage of the neutral point of the energy storage circuit in the voltage controller to −400 volts is equivalent to synchronously increasing the voltage of the neutral point of the power supply system, the voltage of the neutral point of the alternating current side of the inverter, and the voltage of the neutral point of the P-type photovoltaic panel string to −400 volts, so that the voltage between the negative electrode of the P-type photovoltaic panel string and the ground is increased to zero, thereby reducing power consumption of the P-type photovoltaic panel.

It should be noted that, if the photovoltaic panel is a P-type photovoltaic panel, the first alternating current voltage outputted by the voltage controller adjusts the voltage of the neutral point of the alternating current side of the inverter, so that a voltage between a negative electrode of the P-type photovoltaic panel and the ground is greater than or equal to zero volts; or if the photovoltaic panel is an N-type photovoltaic panel, the first alternating current voltage outputted by the voltage controller adjusts the voltage of the neutral point of the alternating current side of the inverter, so that a voltage between a positive electrode of the N-type photovoltaic panel and the ground is less than or equal to zero volts.

Figure 6:
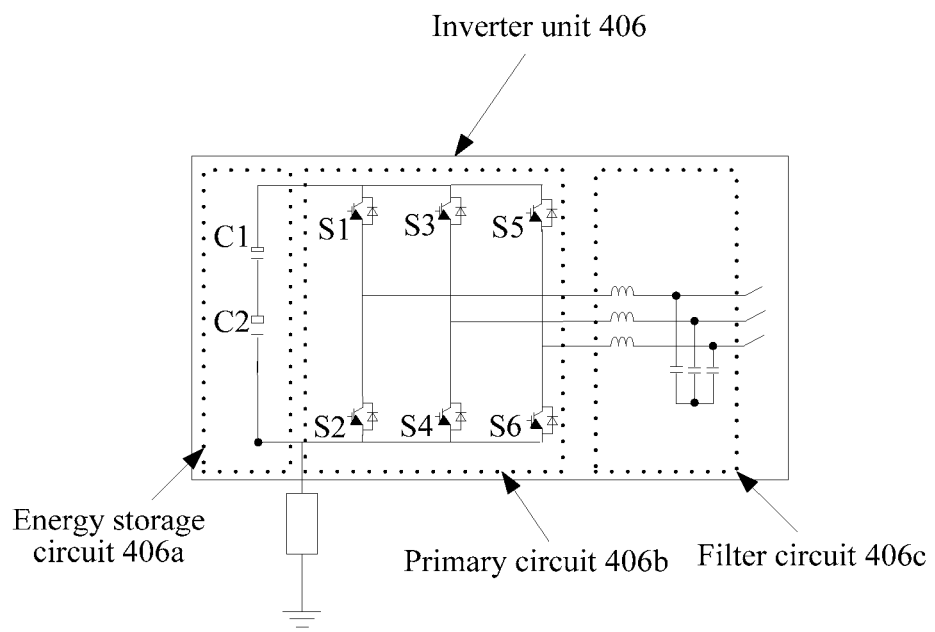
FIG. 6 is a circuit diagram 2 of an inverter unit according to an embodiment of the present invention.

For another example, the energy storage circuit 406a in the inverter unit 406 may further be a circuit shown in FIG. 6, including two capacitance elements C1 and C2. C1 and C2 are connected in series, and C2 is grounded by means of a resistor R or grounded by means of a diode.

Figure 7:
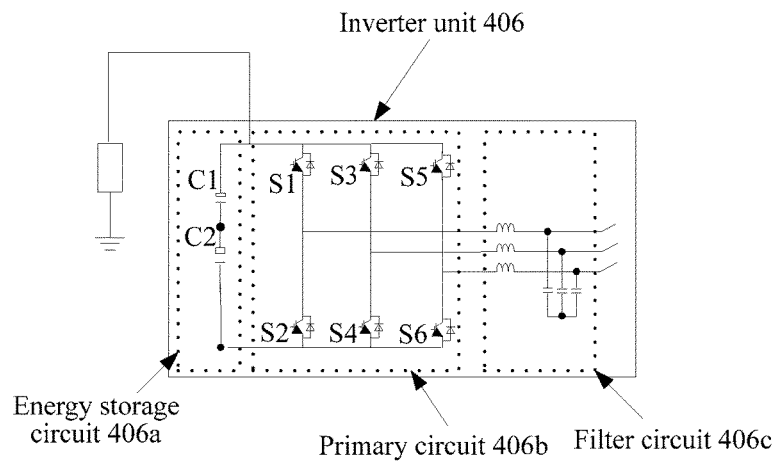
FIG. 7 is a circuit diagram 3 of an inverter unit according to an embodiment of the present invention.

A principle of lowering a positive voltage between the positive electrode of the N-type photovoltaic panel and the ground is the same as that of increasing the negative voltage between the negative voltage of the P-type photovoltaic panel and the ground, and details are not described herein again. For example, when the photovoltaic panel string in the power supply system in this embodiment of the present invention is an N-type photovoltaic panel string, the inverter unit 406 may be of a structure shown in FIG. 7. A positive electrode of the capacitance element in the energy storage circuit 406a is grounded. Specifically, the positive electrode of the capacitance element is directly grounded, or grounded by means of a resistor, or grounded by means of an inductor, or grounded by means of a diode. This is not limited in the present invention.

Figure 8:
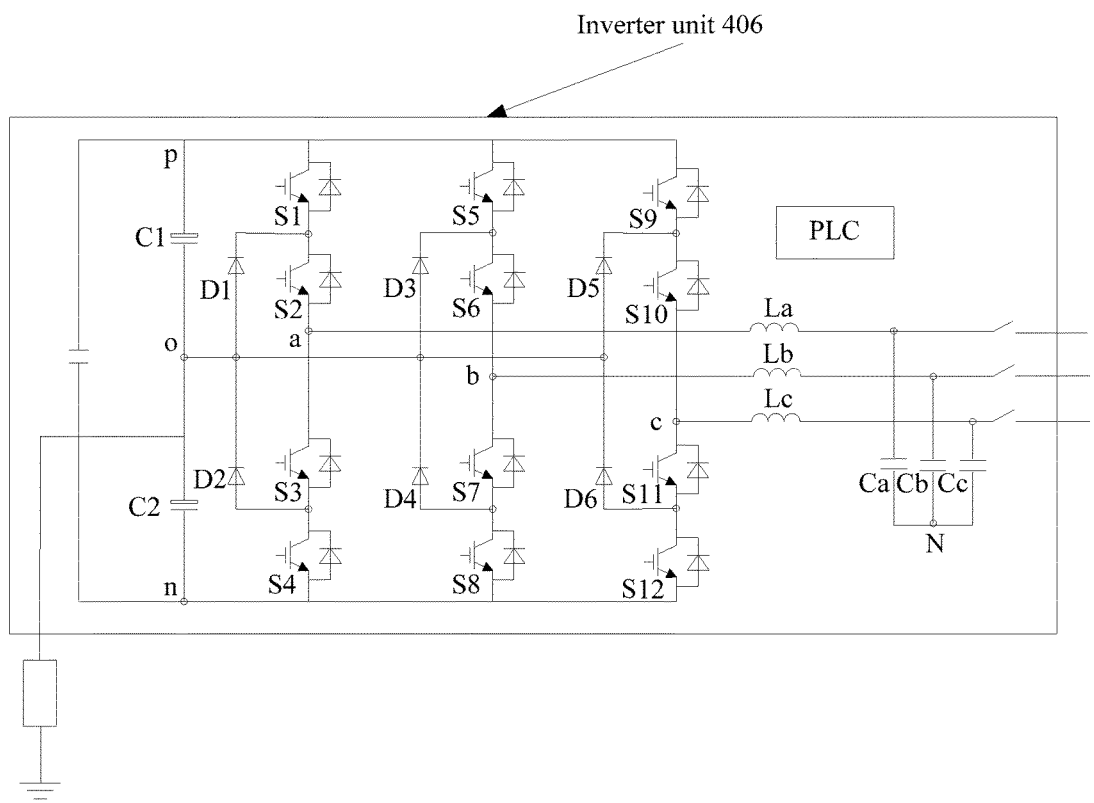
FIG. 8 is a circuit diagram 4 of an inverter unit according to an embodiment of the present invention.

As shown in FIG. 8, in the power supply system provided in this embodiment of the present invention, the inverter unit 406 may alternatively be a three-level inverter circuit. A midpoint between C1 and C2 is grounded by means of a resistor R. After the neutral points of C1 and C2 are grounded by means of a resistor R, if the photovoltaic panel is a P-type photovoltaic panel, and a voltage at two ends of C1 is less than a voltage at two ends of C2 under control of the control unit, a difference between the voltage at the two ends of C1 and the voltage at the two ends of C2 is the voltage between the negative electrode of the P-type photovoltaic panel and the ground; or if the photovoltaic panel is an N-type photovoltaic panel, and a voltage at two ends of C1 is greater than a voltage at two ends of C2 under control of the control unit, a difference between the voltage at the two ends of C1 and the voltage at the two ends of C2 is the voltage between the positive electrode of the N-type photovoltaic panel and the ground. That is, the circuit not only can suppress the PID effect of the P-type photovoltaic panel, but also can suppress the PID effect of the N-type photovoltaic panel, and the circuit only needs to be controlled to work in two different modes.

For another example, the energy storage circuit 406a in the inverter unit 406 may alternatively include multiple capacitance elements. The multiple capacitance elements have the same function as that of one capacitance element or two capacitance elements in this embodiment of the present invention. This is not limited in the present invention.

Figure 9:
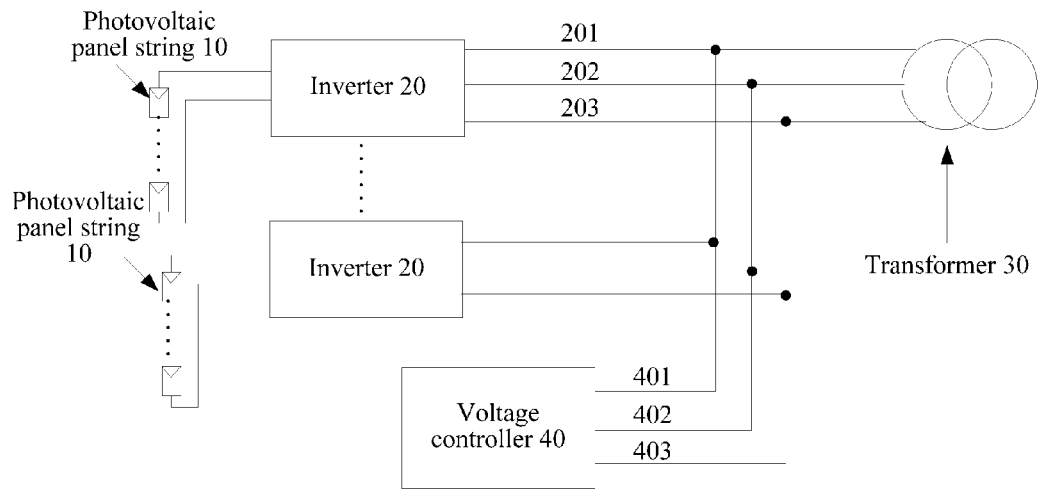
FIG. 9 is a schematic diagram 3 of a power supply system according to an embodiment of the present invention.

An embodiment of the present invention further provides another power supply system. As shown in FIG. 9, the system includes M inverters 20, M photovoltaic panel strings 10, and one voltage controller 40. The M inverters are connected in parallel, an input end of each inverter is connected to one photovoltaic panel string, and an alternating current voltage output end of each inverter is connected to an alternating current voltage output end of the voltage controller.

In such a scenario in which there are multiple photovoltaic panels and multiple inverters, the second communications unit 407 in the voltage controller communicates with the first communications units 205 in the multiple inverters 20, to read a voltage to ground that is of the photovoltaic panel string 10 connected to the input end of each inverter 20 and that is obtained through sampling by the second sampling unit 204. The control unit 405 controls, according to the voltages to ground of the multiple photovoltaic panel strings 10 and an initial voltage (that is, the initial voltage of the neutral point of the inverter unit that is obtained through sampling by the first sampling unit), the inverter unit 406 to output a first alternating current voltage. The first alternating current voltage is used to control the voltage of the neutral point of the alternating current side of the inverter, so that a voltage between a negative electrode of each P-type photovoltaic panel and the ground is greater than or equal to zero volts, or a voltage between a positive electrode of each N-type photovoltaic panel and the ground is less than or equal to zero volts.

An embodiment of the present invention further provides a power supply method, applied to the foregoing power supply system, including: If a photovoltaic panel string is a P-type photovoltaic panel string, a first alternating current voltage outputted by a voltage controller adjusts a voltage of a neutral point of an alternating current voltage output end of an inverter, so that a voltage between a negative electrode of the P-type photovoltaic panel string and ground is greater than or equal to zero volts; or if the photovoltaic panel string is an N-type photovoltaic panel string, the first alternating current voltage outputted by the voltage controller adjusts the voltage of the neutral point of the alternating current voltage output end of the inverter, so that the voltage between the positive electrode of the N-type photovoltaic panel string and the ground is less than or equal to zero volts.

Figure 10:
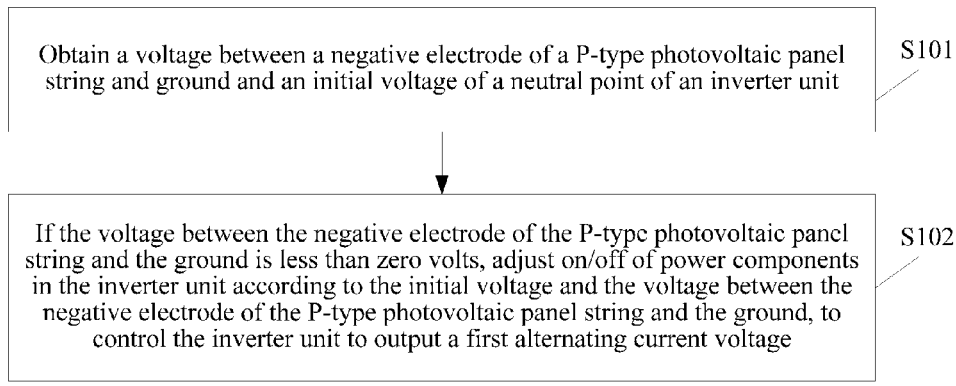
FIG. 10 is a schematic flowchart 1 of a power supply method according to an embodiment of the present invention.

Specifically, as shown in FIG. 10, if the photovoltaic panel string is a P-type photovoltaic panel string, the power supply method includes the following steps:

S101: Obtain a voltage between a negative electrode of the P-type photovoltaic panel string and the ground and an initial voltage of a neutral point of an inverter unit.

The voltage between the negative electrode of the P-type photovoltaic panel string and the ground is obtained through sampling by a sampling unit in the inverter, and the initial voltage of the inverter unit is obtained through sampling by a sampling unit in the voltage controller.

S102: If the voltage between the negative electrode of the P-type photovoltaic panel string and the ground is less than zero volts, adjust on/off of the power components in the inverter unit according to the initial voltage and the voltage between the negative electrode of the P-type photovoltaic panel string and the ground, to control the inverter unit to output the first alternating current voltage.

If a peak amplitude of the first alternating current voltage is greater than a peak amplitude of a second alternating current voltage outputted by the inverter, the control unit controls the energy storage circuit to discharge, to lower the voltage of the neutral point of the alternating current side of the inverter; or if the peak amplitude of the first alternating current voltage is less than the peak amplitude of the second alternating current voltage, the control unit controls the energy storage circuit to be charged, to increase the voltage of the neutral point of the alternating current side of the inverter. The alternating current side of the inverter is a side of the inverter for outputting an alternating current voltage.

Figure 11:
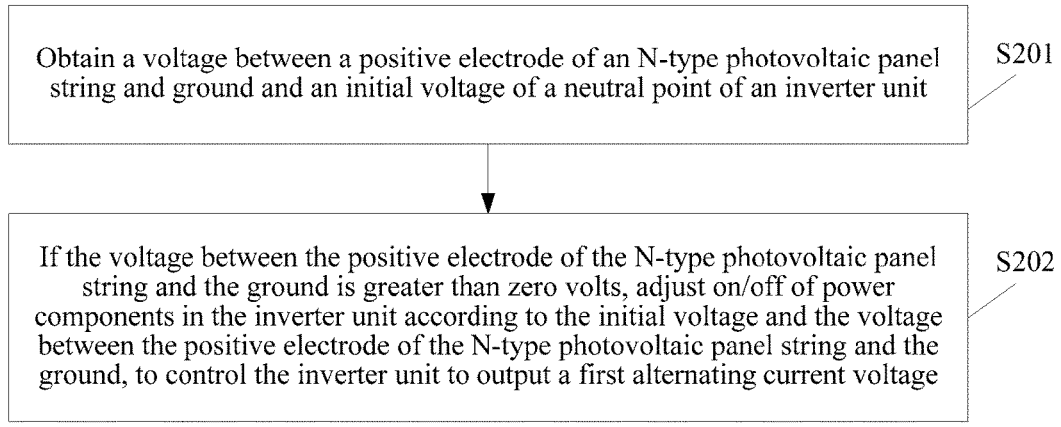
FIG. 11 is a schematic flowchart 2 of a power supply method according to an embodiment of the present invention.

Further, specifically, as shown in FIG. 11, if the photovoltaic panel string is an N-type photovoltaic panel string, the power supply method includes the following steps:

S201: Obtain a voltage between a positive electrode of the N-type photovoltaic panel string and the ground and an initial voltage of a neutral point of an inverter unit.

The voltage between the positive electrode of the N-type photovoltaic panel string and the ground is obtained through sampling by a sampling unit in the inverter, and the initial voltage is obtained through sampling by a sampling unit in the voltage controller.

S202: If the voltage between the positive electrode of the N-type photovoltaic panel string and the ground is greater than zero volts, adjust on/off of power components in the inverter unit according to the initial voltage and the voltage between the positive electrode of the N-type photovoltaic panel string and the ground, to control the inverter unit to output a first alternating current voltage.

A peak amplitude of the first alternating current voltage is greater than a peak amplitude of a second alternating current voltage, so as to cause the inverter unit to discharge, to lower the voltage of a neutral point of the alternating current side of the inverter, so that the voltage between the positive electrode of the N-type photovoltaic panel string and the ground is less than or equal to zero volts.

When the power supply system includes multiple inverters connected in parallel, an input end of each inverter is connected to one photovoltaic panel string, and an alternating current voltage output end of the voltage controller is respectively correspondingly connected to an alternating current voltage output end of each inverter, the power supply method of the power supply system is as follows.

Figure 12:
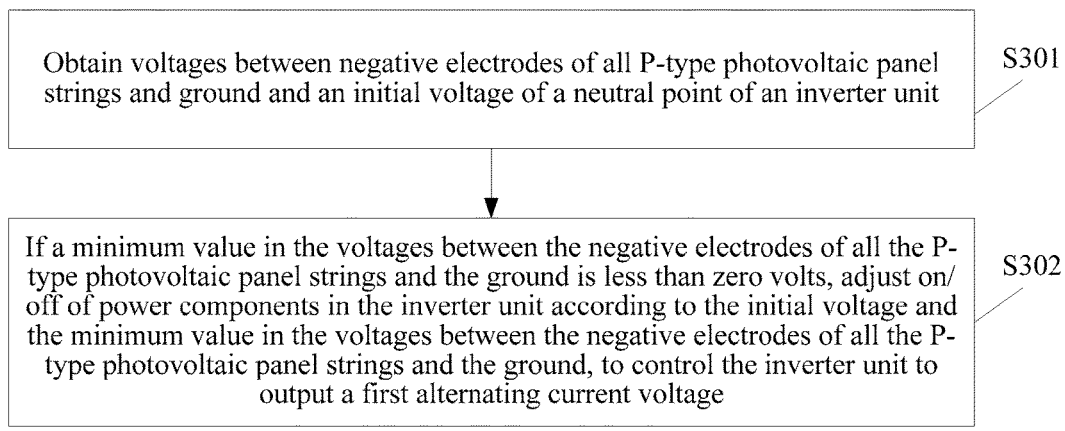
FIG. 12 is a schematic flowchart 3 of a power supply method according to an embodiment of the present invention.

If the photovoltaic panel strings are P-type photovoltaic panel strings, the first alternating current voltage outputted by the inverter unit adjusts the voltage of the neutral point of the alternating current voltage output end of the inverter. As shown in FIG. 12, the power supply method specifically includes:

S301: Obtain voltages between negative electrodes of all the P-type photovoltaic panel strings and the ground and an initial voltage of a neutral point of an inverter unit.

The voltages between the negative electrodes of all the P-type photovoltaic panel strings and the ground are obtained through sampling by a sampling unit in the inverter, and the initial voltage is obtained through sampling by a sampling unit in the voltage controller.

S302: If the smallest value in the voltages between the negative electrodes of all the P-type photovoltaic panel strings and the ground is less than zero volts, adjust on/off of power components in the inverter unit according to the initial voltage and the smallest value in the voltages between the negative electrodes of the P-type photovoltaic panel strings and the ground, to control the inverter unit to output the first alternating current voltage.

A peak amplitude of the first alternating current voltage is less than a peak amplitude of a second alternating current voltage, so as to charge the inverter unit, to lower the voltage of the neutral point of the alternating current side of the inverter, so that the smallest value in the voltages between the negative electrodes of the P-type photovoltaic panel strings and the ground is greater than or equal to zero volts.

Figure 13:
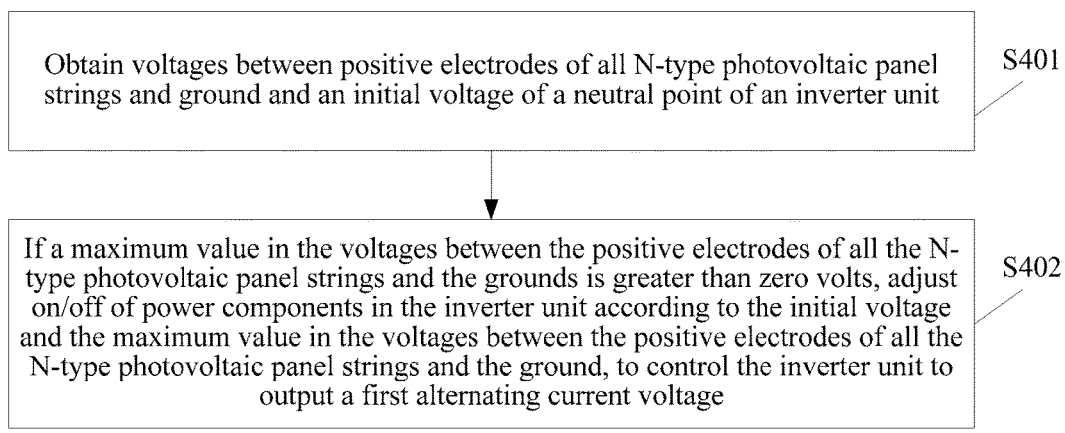
FIG. 13 is a schematic flowchart 4 of a power supply method according to an embodiment of the present invention.

If the photovoltaic panel strings are N-type photovoltaic panel strings, the first alternating current voltage outputted by the inverter unit adjusts the voltage of the neutral point of the alternating current voltage output end of the inverter. As shown in FIG. 13, the power supply method specifically includes:

S401: Obtain voltages between positive electrodes of all the N-type photovoltaic panel strings and the ground and an initial voltage of a neutral point of an inverter unit.

The voltages between the positive electrodes of all the N-type photovoltaic panel strings and the ground are obtained through sampling by a sampling unit in the inverter, and the initial voltage is obtained through sampling by a sampling unit in the voltage controller.

S402: If a largest value in the voltages between the positive electrodes of all the N-type photovoltaic panel strings and the ground is greater than zero volts, adjust on/off of power components in the inverter unit according to the initial voltage and the largest value in the voltages between the positive electrodes of the N-type photovoltaic panel strings and the ground, to control the inverter unit to output the first alternating current voltage.

A peak amplitude of the first alternating current voltage is greater than a peak amplitude of a second alternating current voltage, so as to cause the inverter unit to discharge, to lower the voltage of the neutral point of the alternating current side of the inverter, so that the largest value in the voltages between the positive electrodes of the N-type photovoltaic panel strings and the ground is less than or equal to zero volts.

For example, assuming that there are three photovoltaic panel strings, namely, a photovoltaic panel string 1, a photovoltaic panel string 2, and a photovoltaic panel string 3, the three photovoltaic panel strings are all P-type photovoltaic panels, a voltage between a negative electrode of the photovoltaic panel string 1 and the ground is −500 volts, a voltage between a negative electrode of the photovoltaic panel string 2 and the ground is −400 volts, and a voltage between a negative electrode of the photovoltaic panel string 3 and the ground is −300 volts. The second sampling unit 204 of the inverter 20 samples the voltage between the negative electrode of the photovoltaic panel string connected to the second sampling unit 204 and the ground. The voltage controller 40 communicates with the first communications unit 205 in the inverter 20 by using the second communications unit 407, to obtain the voltages between the negative electrodes of the three photovoltaic panel strings and the ground. The control unit 405 controls, according to a smallest voltage value of −500 volts in the voltages between the negative electrodes of the three P-type photovoltaic panels and the ground and a sampled value of the initial voltage by the first sampling unit 404, the inverter unit 406 to output the first alternating current voltage, to increase the voltage of the neutral point of the alternating current side of the inverter to −500 volts, and optimally compensate for the voltages between the negative electrodes of the three P-type photovoltaic panels and the ground, so that the voltages between the negative electrodes of the three P-type photovoltaic panels and the ground are all at least equal to zero volts.

According to the power supply system and the power supply method that are provided in the embodiments of the present invention, the power supply system includes: a photovoltaic panel string, an inverter, and a transformer. An input end of the inverter is connected to an output end of the photovoltaic panel string, an output end of the inverter is connected to an input end of the transformer, and an output end of the transformer is configured to output a supply voltage. The power supply system further includes a voltage controller. The voltage controller includes: a first sampling unit, a control unit connected to the first sampling unit, and an inverter unit connected to both the first sampling unit and the control unit. The voltage controller further includes: a first terminal, a second terminal, and a third terminal. An end of the first terminal is connected to a first output end of the inverter unit, and the other end of the first terminal is connected to a first output end of the inverter. An end of the second terminal is connected to a second output end of the inverter unit, and the other end of the second terminal is connected to a second output end of the inverter. An end of the third terminal is connected to a third output end of the inverter unit, and the other end of the third terminal is connected to a third output end of the inverter. The inverter unit includes: an energy storage circuit, a primary circuit connected to the energy storage circuit, and a filter circuit connected to the primary circuit. The first sampling unit is configured to sample an initial voltage of a neutral point of the energy storage circuit in the inverter unit. The control unit is configured to control, according to a difference between the initial voltage and the first voltage, on/off of switching transistors of the primary circuit in the inverter unit, so that the filter circuit of the inverter unit outputs a first alternating current voltage, where the first voltage is a voltage to ground of the photovoltaic panel string connected to the input end of the inverter. The inverter unit is configured to output the first alternating current voltage under control of the control unit. If a peak amplitude of the first alternating current voltage is greater than a peak amplitude of a second alternating current voltage outputted by the inverter, the control unit controls the energy storage circuit to discharge, to lower a voltage of a neutral point of an alternating current side of the inverter; or if the peak amplitude of the first alternating current voltage is less than the peak amplitude of the second alternating current voltage, the control unit controls the energy storage circuit to be charged, to increase the voltage of the neutral point of the alternating current side of the inverter. The alternating current side of the inverter is a side of the inverter for outputting an alternating current voltage. In the prior art, a positive electrode or a negative electrode of each photovoltaic panel needs to be connected to a direct current voltage source by using a lead, making it relatively difficult to operate. By means of the solution provided in the present invention, no lead needs to be added to the positive electrode or the negative electrode of the photovoltaic panel, so that costs of leads between devices can be reduced.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A power supply system, comprising: a photovoltaic panel string, an inverter, and a transformer, wherein an input end of the inverter is connected to an output end of the photovoltaic panel string, an output end of the inverter is connected to an input end of the transformer, and an output end of the transformer is configured to output a supply voltage, the power supply system further comprising a voltage controller, wherein
the voltage controller comprises: a first sampling unit, a control unit connected to the first sampling unit, and an inverter unit connected to both the first sampling unit and the control unit; and
the voltage controller further comprises: a first terminal, a second terminal, and a third terminal, wherein
an end of the first terminal is connected to a first output end of the inverter unit, the other end of the first terminal is connected to a first output end of the inverter, an end of the second terminal is connected to a second output end of the inverter unit, the other end of the second terminal is connected to a second output end of the inverter, an end of the third terminal is connected to a third output end of the inverter unit, and the other end of the third terminal is connected to a third output end of the inverter;
the inverter unit comprises: an energy storage circuit, a primary circuit connected to the energy storage circuit, and a filter circuit connected to the primary circuit;
the first sampling unit is configured to sample an initial voltage of a neutral point of the energy storage circuit in the inverter unit; the control unit is configured to determine, according to a difference between the initial voltage and a first voltage, a duty cycle of a pulse width modulation (PWM) signal outputted by the control unit, and drive on/off of switching transistors of the primary circuit in the inverter unit according to the PWM signal, so as to control the inverter unit to output a first alternating current voltage through the filter circuit, wherein the first voltage is a voltage to ground of the photovoltaic panel string connected to the input end of the inverter; and the inverter unit is configured to output the first alternating current voltage under control of the control unit; and
if a peak amplitude of the first alternating current voltage is greater than a peak amplitude of a second alternating current voltage outputted by the inverter, the control unit controls the energy storage circuit to discharge, to lower a voltage of a neutral point of an alternating current side of the inverter; or if the peak amplitude of the first alternating current voltage is less than the peak amplitude of the second alternating current voltage, the control unit controls the energy storage circuit to be charged, to increase the voltage of the neutral point of the alternating current side of the inverter, wherein the alternating current side of the inverter is a side of the inverter for outputting an alternating current voltage.

2. The power supply system according to claim 1, wherein the energy storage circuit comprises at least one capacitance element, wherein the capacitance element is directly grounded, or grounded by means of an inductor, or grounded by means of a resistor, or grounded by means of a diode; the primary circuit is a three-phase inverter bridge circuit, and is configured to convert a first direct current voltage to the first alternating current voltage, wherein the first direct current voltage is a voltage of the energy storage circuit; and the filter circuit is configured to output the first alternating current voltage.

3. The power supply system according to claim 2, wherein the energy storage circuit comprises two capacitance elements, wherein the two capacitance elements are connected in series, and a midpoint between the two capacitance elements is directly grounded, or grounded by means of an inductor, or grounded by means of a resistor, or grounded by means of a diode.

4. The power supply system according to claim 1, wherein the inverter comprises: a second sampling unit and a first communications unit connected to the second sampling unit, and the voltage controller further comprises a second communications unit, wherein
the second sampling unit is configured to sample the voltage to ground of the photovoltaic panel string connected to the input end of the inverter, the first communications unit is configured to communicate with the second communications unit in the voltage controller, and the second communications unit is configured to communicate with the first communications unit in the inverter, to obtain the voltage to ground of the photovoltaic panel string connected to the input end of the inverter.

5. The power supply system according to claim 1, wherein the inverter unit is a two-level inverter circuit, or a three-level inverter circuit, or a multi-level inverter circuit.

6. The power supply system according to claim 1, wherein the power supply system comprises M inverters, M photovoltaic panel strings, and one voltage controller, wherein the M inverters are connected in parallel, an input end of each inverter is connected to an output end of one photovoltaic panel string, an output end of each inverter is connected to the input end of the transformer, a first output end of each inverter is connected to the first terminal of the voltage controller, a second output end of each inverter is connected to the second terminal of the voltage controller, and a third output end of each inverter is connected to the third terminal of the voltage controller.

7. A power supply method, comprising:
obtaining a first voltage and an initial voltage, wherein the first voltage is a voltage to ground of a photovoltaic panel string connected to an input end of an inverter, and the initial voltage is an initial voltage of a neutral point of an inverter unit in a voltage controller;
controlling, according to the first voltage and the initial voltage, the inverter unit to output a first alternating current voltage; and
if a peak amplitude of the first alternating current voltage is greater than a peak amplitude of a second alternating current voltage outputted by the inverter, controlling the inverter unit to discharge, to lower a voltage of a neutral point of an alternating current side of the inverter; or if the peak amplitude of the first alternating current voltage is less than the peak amplitude of the second alternating current voltage, controlling the inverter unit to be charged, to increase the voltage of the neutral point of the alternating current side of the inverter, wherein
the alternating current side of the inverter is a side of the inverter for outputting an alternating current voltage.

8. The power supply method according to claim 7, wherein if the photovoltaic panel string is a P-type photovoltaic panel string, the power supply method specifically comprises:
obtaining a voltage between a negative electrode of the P-type photovoltaic panel string and ground and the initial voltage of the neutral point of the inverter unit; and
if the voltage between the negative electrode of the P-type photovoltaic panel string and the ground is less than zero volts, adjusting on/off of power components in the inverter unit according to the initial voltage and the voltage between the negative electrode of the P-type photovoltaic panel string and the ground, to control the inverter unit to output the first alternating current voltage, wherein the peak amplitude of the first alternating current voltage is less than the peak amplitude of the second alternating current voltage, so as to charge the inverter unit, to increase the voltage of the neutral point of the alternating current side of the inverter, so that the voltage between the negative electrode of the P-type photovoltaic panel string and the ground is greater than or equal to zero volts.

9. The power supply method according to claim 7, wherein if the photovoltaic panel string is an N-type photovoltaic panel string, the power supply method specifically comprises:
obtaining a voltage between a positive electrode of the N-type photovoltaic panel string and ground and the initial voltage of the neutral point of the inverter unit; and
if the voltage between the positive electrode of the N-type photovoltaic panel string and the ground is greater than zero volts, adjusting on/off of power components in the inverter unit according to the initial voltage and the voltage between the positive electrode of the N-type photovoltaic panel string and the ground, to control the inverter unit to output the first alternating current voltage, wherein the peak amplitude of the first alternating current voltage is greater than the peak amplitude of the second alternating current voltage, so as to cause the inverter unit to discharge, to lower the voltage of the neutral point of the alternating current side of the inverter, so that the voltage between the positive electrode of the N-type photovoltaic panel string and the ground is less than or equal to zero volts.

10. The power supply method according to claim 7, wherein there are M inverters and M photovoltaic panel strings, the M inverters are connected in parallel, an input end of each inverter is connected to one photovoltaic panel string, and if the photovoltaic panel strings are P-type photovoltaic panel strings, the power supply method specifically comprises:
obtaining voltages between negative electrodes of all the P-type photovoltaic panel strings and ground and the initial voltage of the neutral point of the inverter unit; and
if the smallest value in the voltages between the negative electrodes of all the P-type photovoltaic panel strings and the ground is less than zero volts, adjusting on/off of power components in the inverter unit according to the initial voltage and the smallest value in the voltages between the negative electrodes of all the P-type photovoltaic panel strings and the ground, to control the inverter unit to output the first alternating current voltage, wherein the peak amplitude of the first alternating current voltage is less than the peak amplitude of the second alternating current voltage, so as to charge the inverter unit, to increase the voltage of the neutral point of the alternating current side of the inverter, so that the smallest value in the voltages between the negative electrodes of the P-type photovoltaic panel strings and the ground is greater than or equal to zero volts.

11. The power supply method according to claim 7, wherein there are M inverters and M photovoltaic panel strings, the M inverters are connected in parallel, an input end of each inverter is connected to one photovoltaic panel string, and if the photovoltaic panel strings are N-type photovoltaic panel strings, the power supply method specifically comprises:

obtaining voltages between positive electrodes of all the N-type photovoltaic panel strings and ground and the initial voltage of the neutral point of the inverter unit; and if a largest value in the voltages between the positive electrodes of all the N-type photovoltaic panel strings and the ground is greater than zero volts, adjusting on/off of power components in the inverter unit according to the initial voltage and the largest value in the voltages between the positive electrodes of all the N-type photovoltaic panel strings and the ground, to control the inverter unit to output the first alternating current voltage, wherein the peak amplitude of the first alternating current voltage is greater than the peak amplitude of the second alternating current voltage, so as to cause the inverter unit to discharge, to lower the voltage of the neutral point of the alternating current side of the inverter, so that the largest value in the voltages between the positive electrodes of the N-type photovoltaic panel strings and the ground is less than or equal to zero volts.

* * * * *